(12) United States Patent  
Shapiro

(10) Patent No.: US 7,590,975 B1  
(45) Date of Patent: Sep. 15, 2009

(54) MECHANISM FOR TRANSLATION OF DATA IN AN EXECUTION FRAMEWORK

(75) Inventor: Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1056 days.

(21) Appl. No.: 10/713,649

(22) Filed: Nov. 14, 2003

(51) Int. Cl.
 *G06F 9/44* (2006.01)
 *G06F 7/00* (2006.01)

(52) U.S. Cl. ................................. 717/130; 707/101
(58) Field of Classification Search ................. None
 See application file for complete search history.

(56) References Cited

U.S. PATENT DOCUMENTS

| | | | | |
|---|---|---|---|---|
| 6,151,702 | A * | 11/2000 | Overturf et al. | 717/136 |
| 6,481,008 | B1 * | 11/2002 | Chaiken et al. | 717/158 |
| 6,662,356 | B1 * | 12/2003 | Edwards et al. | 717/113 |
| 2004/0205720 | A1 * | 10/2004 | Hundt | 717/124 |

OTHER PUBLICATIONS

Tamches, Ariel and Miller, Barton P; Fine-Grained Dynamic Instrumentation of Commodity Operating System Kernels; [Online]; http://www.usenix.org/publications/library/proceedings/osdi99/full_papers/tamches.pdf, Published Feb. 1999.

Murayama, John; "Performance Profiling Using TNF"; [Online]; http://developers.sun.com/solaris/articles/tnf.html, Jul. 2001.

Lorch, Jacob R. and Smith, Alan J.; "The Vtrace Tool: Building a system Tracer for Windows NT and Windows 2000"; [Online] http://msdn.microsoft.com/msdnmag/issues/1000/Vtrace/default.aspx, Oct. 2000.

"Chapter 10. The Generalized Trace Facility (GTF)"; [Online]; http://publib.boulder.ibm.com/cgi-bin/bookmgr/BOOKS/IEA2V100/CCONTENTS, Jan. 2001.

Mirgorodskii, Alex; "The Path to Portable Kernel Instrumentation: The Kerninst API"; http://www.dyninst.org/mtg2003/slides/KerninstAPI.pdf, Apr. 2003.

Richard Moore, et al.; "IBM Dynamic Probes"; http://www-124.ibm.com/developerworks/opensource/linux/projects/dprobes/README, 2000.

K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

* cited by examiner

*Primary Examiner*—Michael J Yigdall  
(74) *Attorney, Agent, or Firm*—Osha • Liang LLP

(57) ABSTRACT

A method of translating data including obtaining a value of an implementation data structure from an instrumented program, accessing a translator associated with the instrumented program, wherein the translator comprises a plurality of transformations and translating the value of the implementation data structure using the translator to obtain translated data, wherein the translating comprises applying the plurality of transformations to convert a representation of the implementation data structure into an interface data structure.

23 Claims, 4 Drawing Sheets

MECHANISM FOR TRANSLATION OF DATA IN AN EXECUTION FRAMEWORK

BACKGROUND

Software engineers use many techniques, tools, and practices in order build robust software. One such software engineering technique is use of abstraction layers, which are used to translate internal program data structures into interface-oriented data structures. A standard technique for creating a data structure abstraction in programming languages is to provide only a forward declaration of a data structure in public header files, while keeping the corresponding struct definition in a separate private header file.

For example, a programmer who wishes to know the file descriptor corresponding to a FILE data structure can use an appropriate function to obtain the descriptor value rather than dereferencing a member of the corresponding struct directly. By abstracting the details of the data structure implementation away from client programs that call the function, the programmer retains the freedom to change the implementation, content, and data layout of the data structure.

Another example of a technique to improve the robustness of software uses a system call instead of using a function call as above. This technique is to design a program so that the implementation of the program can evolve and change over time, while still maintaining a consistent set of external program interfaces. These same interfaces are offered with each release of the operating system, even though the operating system's internal data structures and implementation may vary as new releases are offered.

Another software engineering practice used to build robust software is the use of tracing frameworks and debuggers. A tracing framework is a collection of software routines and tools that permit a user to instrument and record the activity of one or more executing programs, such as an operating system kernel. The user may provide to the tracing framework instrumentation requests that obtain information about the activity of the executing programs. Tracing frameworks typically permit users to describe instrumentation requests by naming one or more probes, which are locations in the executing program. The probes are used as data-recording sites.

Associated with a probe is one or more actions that describe what is to be done when program execution passes through the probe. Tracing frameworks usually provide either a defined set of actions at each probe, a set of user-selectable actions, or the ability to execute an arbitrary set of actions that are written in a high-level programming language. In tracing frameworks that support a programming language for defining actions, language statements are compiled into an intermediate form, or directly into binary code (i.e., object code), and then executed when the probe is triggered by execution of the instrumented program.

Because probes are locations of instrumentation within the executing instrumented program, the probes are therefore associated with the implementation and an embodiment of the executing program. The tracing framework actions provide access to data memory associated with the instrumented program. The data memory is arranged into a set of implementation data structures associated with the internal implementation details and artifacts of the instrumented program.

A debugger is another tool that allows inspection of an instrumented program executing under complete or partial control of the debugger. A debugger is distinct from a tracing framework in that a debugger typically provides a mechanism whereby the instrumented program stops executing at instrumented locations of interest and then is inspected by a user of the debugger before subsequently continuing execution. In contrast, a tracing framework typically permits users to perform additional actions only while the instrumented program is executing. Examination of the results occurs after the execution is complete, or in parallel with execution of the instrumented program. Debuggers are similar to tracing frameworks in that both offer a facility whereby the user may view the data memory of the instrumented program and control the format and organization of the memory display.

SUMMARY

In general, in one aspect, the invention relates to a method of translating data comprising obtaining a value of an implementation data structure from an instrumented program, accessing a translator associated with the instrumented program, wherein the translator comprises a plurality of transformations, and translating the value of the implementation data structure using the translator to obtain translated data, wherein the translating comprises applying the plurality of transformations to convert a representation of the implementation data structure into an interface data structure.

In general, in one aspect, the invention relates to a system for translating data comprising an instrumented program comprising at least one implementation data structure, a translator comprising a plurality of transformations, a compiler arranged to accept the translator and transform a value of the at least one implementation data structure into translated data, and an execution framework configured to receive the translated data.

In general, in one aspect, the invention relates to a computer system for translating data comprising a processor, a memory, a storage device, and software instructions stored in the memory for enabling the computer system to obtain a value of an implementation data structure from an instrumented program, access a translator associated with the instrumented program, wherein the translator comprises a plurality of transformations and translate the value of the implementation data structure using the translator to obtain translated data, wherein the translating comprises applying the plurality of transformations to convert a representation of the implementation data structure into an interface data structure.

Other aspects and advantages of the invention will be apparent from the following description and the appended claims.

DETAILED DESCRIPTION

Figure 1:
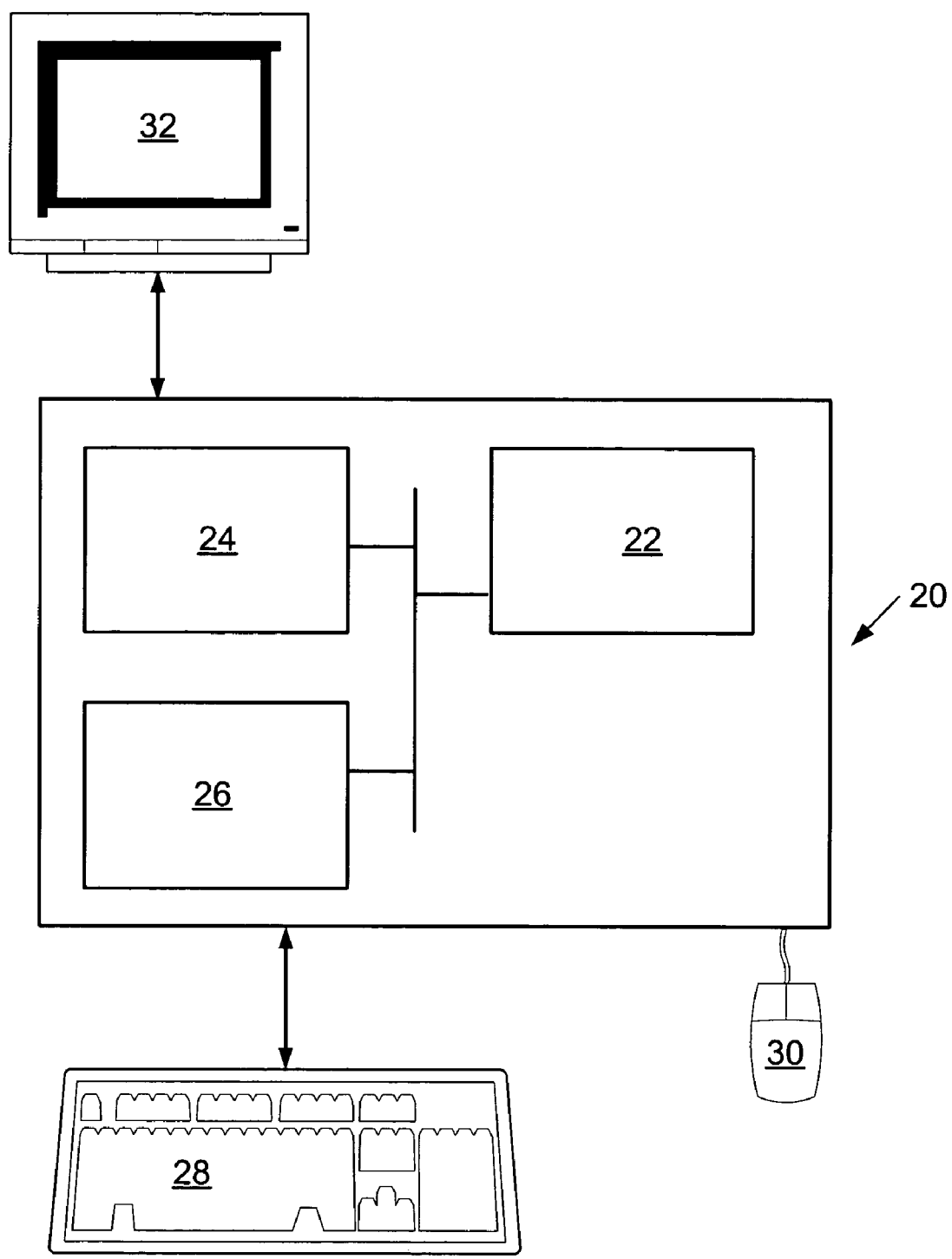
FIG. 1 shows a typical networked computer system in accordance with one or more embodiments of the invention.

Exemplary embodiments of the invention will be described with reference to the accompanying drawings. Like items in the drawings are shown with the same reference numbers.

In the following detailed description of an embodiment of the invention, numerous specific details are set forth in order to provide a more thorough understanding of the invention. However, it will be apparent to one of ordinary skill in the art that the invention may be practiced without these specific details.

In other instances, well-known features have not been described in detail to avoid obscuring the invention.

An embodiment of the invention may be implemented on virtually any type computer regardless of the platform being used. For example, as shown in FIG. 1, a typical networked computer system (20) includes a processor (22), associated memory (24), a storage device (26), and numerous other elements and functionalities typical of today's computers (not shown). The computer (20) may also include input means, such as a keyboard (28) and a mouse (30), and output means, such as a monitor (32). Those skilled in the art will appreciate that these input and output means may take other forms. The networked computer system (20) is connected to a local area network (LAN) or a wide area network (e.g., the Internet) via a network interface connection (not shown). Those skilled in the art will also appreciate that one or more elements of the aforementioned computer (20) may be located at a remote location and connected to the other elements over a network.

One embodiment of the present invention relates to a method and mechanism to allow implementation data structures to be translated into stable data structures that form or are associated with an existing interface offered by an instrumented program. Such translation enhances the usability of a tracing framework and a debugger (i.e., an execution framework) by allowing translated data to be accessed by a user without requiring constant modifications to tracing programs. When a user of an execution framework requests the display of data memory associated with a particular implementation structure, the execution framework uses a translator to translate the implementation data structure from its native form as an internal program data structure into a stable data structure. The stable data structure forms another type of interface offered by the instrumented program for users who are analyzing the execution of the program using an execution framework.

Translators can be applied either at the explicit request of the user of an execution framework or they can be applied implicitly and automatically based on the framework tool's existing knowledge of the program source code as facilitated by a number of standard mechanisms.

Figure 2:
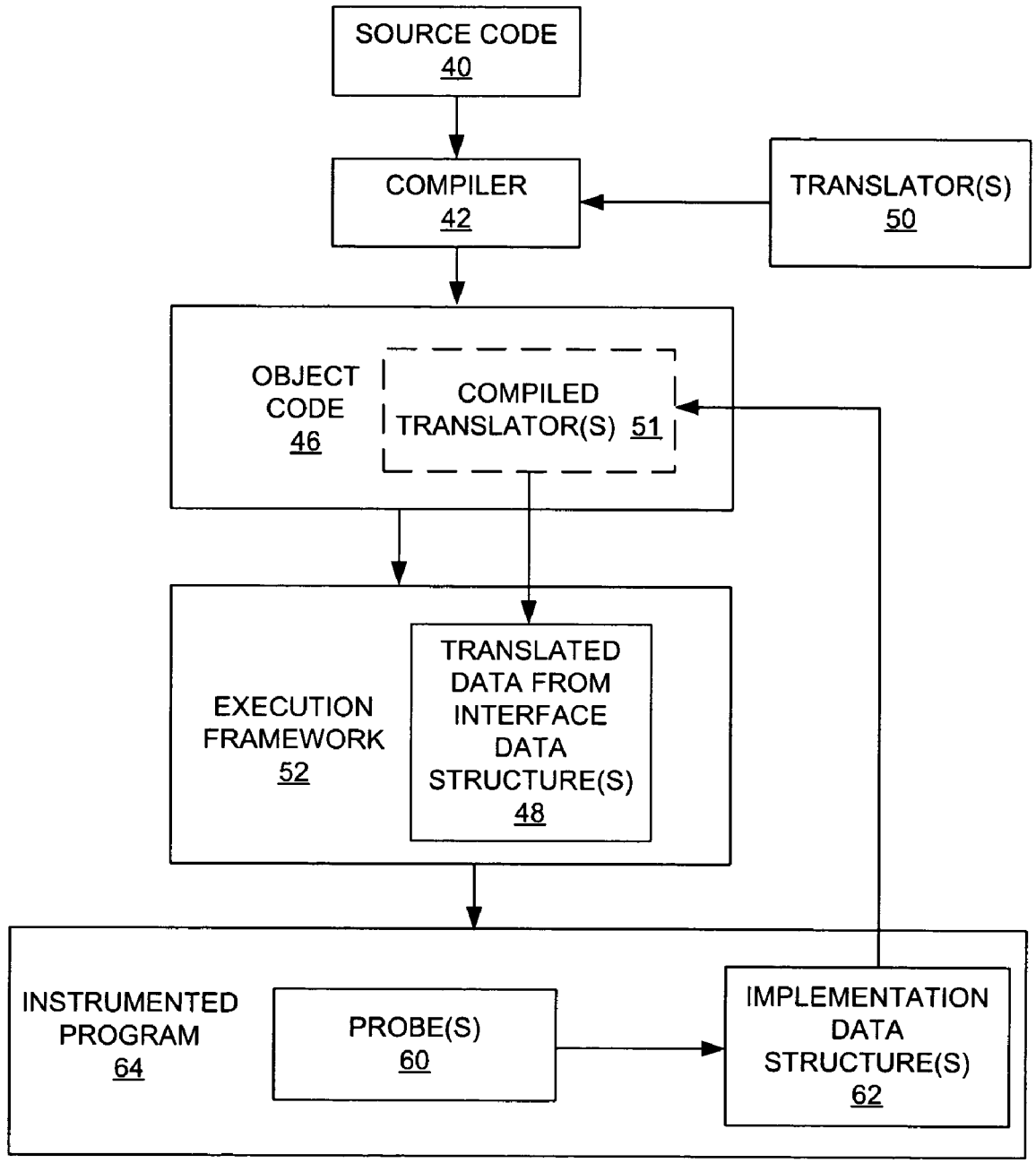
FIG. 2 shows a flow diagram of a system to translate data accessible to users of an execution framework using compiled delivery in accordance with one or more embodiments of the invention.

In accordance with an embodiment of the invention, FIG. 2 shows a flow diagram of a system to translate data accessible to users of an execution framework using compiled delivery. The source code (40) is written in an appropriate high-level programming language that supports use of composite structures (e.g., similar to structs in the "C" programming language), and is input into the compiler (42) to generate the object code (46).

The source code (40) may include instrumentation requests (not shown), e.g., a function to access memory within a tracing program or within a debugging program. For example, a user of the execution framework (52) may create an instrumentation request as an action that requests a value of a file descriptor for a FILE structure in an instrumented program (64). A probe (60) in the instrumented program (64) is enabled by this instrumentation request and may be triggered during execution of the instrumented program (64).

In one embodiment of the invention, when the instrumented program (64) (or some portion thereof) is created by a programmer, one or more translators (50) associated with the instrumented program (64) are also generated by the programmer. Translator(s) refers to a set of transformations that convert the representation of implementation data structure(s) (62), called the input, into an interface data structure(s) (not shown), called the output. These translator(s) (50) are generated in an attempt to abstract the details of the file structure (i.e., one or more implementation data structures (62)) away from a user writing the instrumentation request. One skilled in the art can appreciate that the translator(s) (50) may be generated at a date later than the creation of the instrumented program (64) and that the translator(s) (50) for certain portions of the instrumented program (64) may never be generated.

In one or more embodiments of the invention, any number of translator(s) (50) can be associated with a given instrumented program (64). If the instrumented program (64) itself is composed of compiled objects obtained from a variety of authors or business entities, each compiled object can be delivered with its own translator(s) (50) that were developed independently, and the execution framework can be made to dynamically discover the translator(s) (50) and make use of them when analyzing the composed instrumented program (64). In accordance with an embodiment of the invention, the structure of the translator(s) (50) and a method for using the translator(s) (50) are described in greater detail below.

The translator(s) (50) (including the translator definitions described below) can be delivered using a number of delivery mechanisms. In one embodiment of the invention, translator(s) (50) can be delivered using compiled delivery. Using this delivery mechanism, a set of files of source code (40) is written in the high-level language associated with the execution framework (52). These translator files can be processed and compiled by a compiler (42) as part of the execution of the execution framework (52).

Specifically, the appropriate translator(s) (50) that are deemed necessary (because of an association with one or more implementation data structure(s) (62)) are provided to the compiler (42). Upon compilation, object code (46) is generated including compiled translators (51) that can be accessed during execution of the instrumented program. During execution of the instrumented program, a value of the implementation data structure(s) (62) is translated using compiled translator(s) (51) to produce translated data (48). In an embodiment of the invention, this data (48) is then accessible by a user through the execution framework (52).

In one embodiment of the invention, translator(s) can also be delivered using encoded delivery. This form of delivery uses a set of data structures that can be encoded directly in object code (i.e., compiled source code binaries that are to be instrumented). These data structures represent the syntax tree(s) for the translator(s), and can be written in binary form to a predefined section of an object file when the object file is in an extensible format that permits new sections to be added. While other object file formats are possible, two standard object file formats which are known to permit extensible sections are Executable and Linkable Format (ELF) and Common Object File Format (COFF).

A translator definition is a collection of source code expressions (written in an appropriate high-level programming language) that can be compiled into a syntax tree and used to generate code corresponding to each member of the interface data structure based on a current value of the implementation data structure. The translator declaration defines how to translate members of an implementation data structure into members of a stable data structure (the name and member names of which are defined in a stable data structure definition). In accordance with an embodiment of the invention, translator declarations and stable data structure definitions are created using programming language statements, such as C language statements used to define and declare C language structs.

Translator definitions are later bound to the corresponding compiled source code (i.e., tracing programs or debugging functions) and can be updated along with this program independently of the execution framework. The translator definition is compiled into a representation that can be applied by the tracing framework or debugger to create intermediate code or object code that performs the translation at the user's request in a debugger, or when a probe fires in a tracing framework. This representation includes a data structure representing each translator and noting its input and output types, the members of the output type that can be translated, and the syntax tree for the transformation to be applied to each member.

The syntax tree for each member can include nodes corresponding to any of the defined operators and features of the programming language used to describe actions in the tracing framework or debugger, including but not limited to, typical language features such as arithmetic operations, array references, and function calls.

In accordance with an embodiment of the invention, an example of the translator definition using expressions in the "D" language follows. The translator definition includes a translator declaration to declare a translator of the following form:

translator output-type <input-type input-identifier>
{
    member-name = expression
    member-name = expression ;
    . . .
};

The output-type in the translator declaration above names a data structure that is a result type for the translation, i.e., a data type for the stable data structure (48). The input-type specifies the type of an input expression, and is surrounded in angle brackets < > and followed by an input-identifier that can be used in translator expressions as an alias for the input expression. The input expression defines how to translate the value of a member of an implementation data structure to a member of the output type, which is the stable data structure.

The body of the translator declaration is surrounded in braces { } and terminated with a semicolon (;), and includes a list of member-name identifiers and corresponding translation expressions. Each member declaration names a unique member of the output-type and is assigned an expression of a type compatible with the member type, according to the rules for the language assignment operator (=).

The translator definition includes a stable data structure definition. For example, a stable data structure is defined using information about stdio.h files, such as the following:

struct file_info {
    int file_fd; /* file descriptor from fileno(3C) */
    int file_eof; /* indicator of end-of-file from*/
    /* feof(3C) */
};

A exemplary translator declaration for translating from the implementation data structure named FILE to the stable data structure file_info may be declared as follows:

translator struct file_info < FILE *F >
{
    file_fd = ((struct file_impl *)F)->fd;
    file_eof = (((struct file_impl *)F)->flags & EOF_FLAG) !=0;
};

In the example translator declaration above, the input expression is of type FILE * and is assigned the input-identifier F. The identifier F can then be used in the translator member expressions as a variable of type FILE * that is only visible within the body of the translator declaration. To determine the value of the output file_fd member, the translator performs a cast and dereference similar to the example implementation of fileno (3C) shown above. A similar translation is performed to obtain the value of the EOF indicator.

Figure 3:
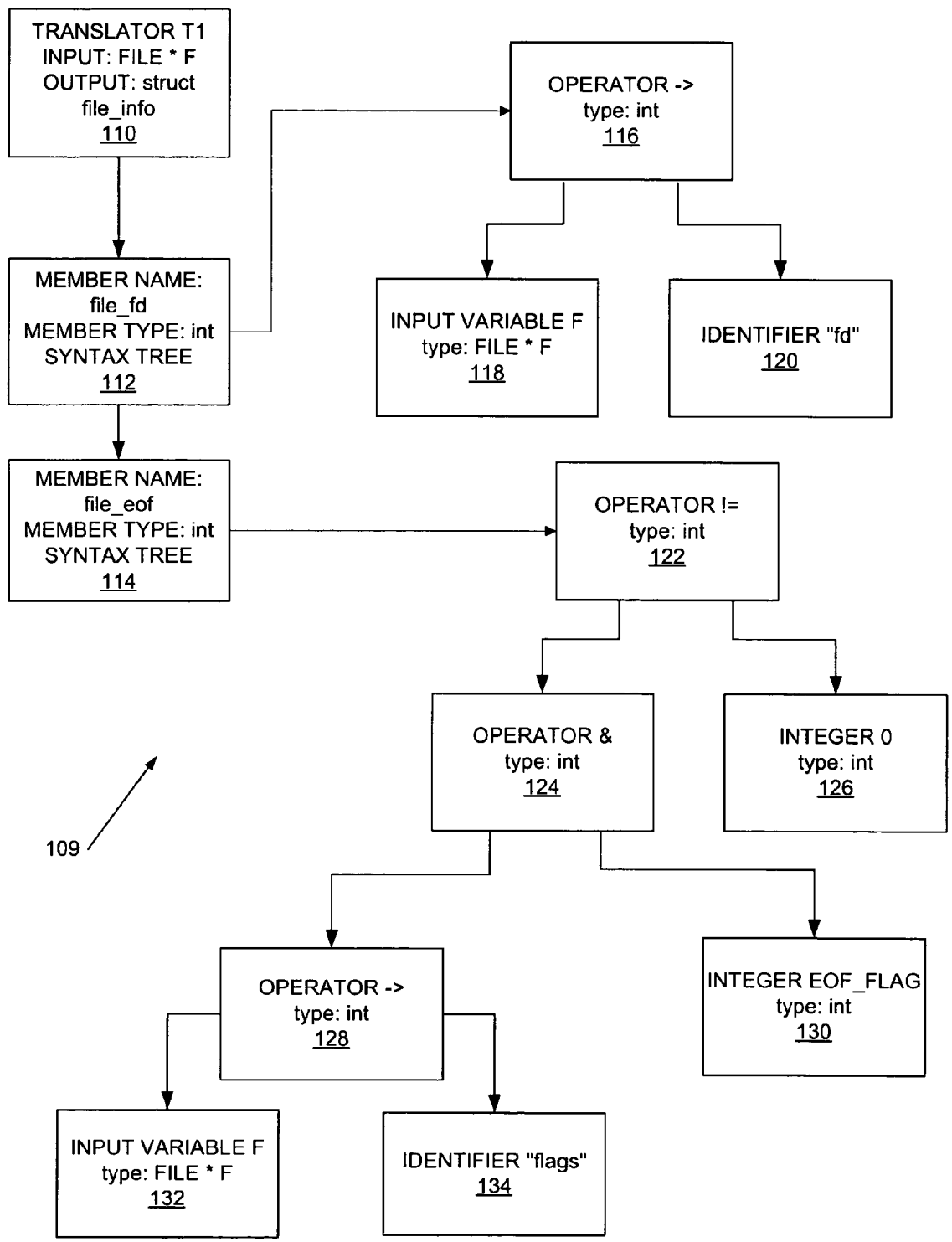
FIG. 3 shows a translator definition data structure in accordance with an embodiment of the invention.

An exemplary translator definition data structure (109) is shown in FIG. 3. Translator T1 (110) has an output type of struct file_info and input type Of FILE *F. Translator T1 has 2 members: file_fd (112) and file_eof (114). In order to translate the values of members of implementation data structure FILE *F to values of the values of members of stable data structure file_info, each member of the translator definition data structure (109) has a syntax tree. The file_fd (112) member has a syntax tree that includes nodes (116-120). The file_eof (114) member has a syntax tree that includes nodes (122-134).

In one or more embodiments, the execution framework can provide a facility for the user to request an explicit translation from an implementation data structure to an interface data structure if a corresponding translator has been defined. For example, in one embodiment of explicit translation in a tracing framework, actions are described by the user of the tracing framework by writing expressions in the D language. The embodiment provides a D language operator keyword "xlate" to request that the tracing framework perform a translation from expression of an implementation data structure to a translation interface data structure. The "xlate" operator is used in an expression of the form:

xlate < output-type > ( input-expression ).

For example, to invoke the translator for FILE structs defined above, a user of the tracing framework writes the expression:

xlate < struct file_info > (f), where f is an expression of type FILE *. The xlate expression itself is then assigned the type defined by the output-type.

The D language embodiment permits any of the language operators that are valid for the output-type to be applied to the resulting expression. For example, the "." operator in C and D programming languages can be used to reference a member of a data structure. Therefore, the file_fd member of the translated struct file_info can be accessed using the following D language source code statement:

xlate < struct file_info > (f) . file_fd

In order to find a matching translator for an xlate operation, the D compiler embodiment examines the set of available translators in the following order:

(1) The compiler searches for a translation from the exact input expression type to the exact output type;

(2) The compiler resolves the input and output types by following any type aliases to the underlying type names, and then searches for a translation from the resolved input type to the resolved output type;

(3) The compiler searches for a translation from a compatible input type to the resolved output type. The compiler uses the same rules as it does for determining compatibility of function call arguments with function prototypes in order to determine if an input expression type is compatible with a translator's input type; and (4) If no matching translator can be found according to these rules, the D compiler produces an appropriate error message informing the user that the requested translation is not available.

Debuggers and tracing frameworks typically make use of auxiliary information created expressly for these tools by a compiler in order to format program data structures according to source language descriptions and determine the number and type of arguments associated with program functions. The UNIX debugger data formats "stabs" and "DWARF" are two example embodiments of this type of debugger information. If an execution framework has access to such information in combination with access to translators, the execution framework can perform a set of implicit translations on behalf of the user.

Specifically, if an execution framework offers the ability to instrument the entry to or return from a program function, and the auxiliary debug information associated with the program describes the argument types and return type associated with each program function, the execution framework can examine each argument type and return type and determine whether a translator with a corresponding input type is available. If so, the execution framework tool can automatically apply the selected translator to each function argument or to the function return type when execution of the instrumented program reaches a function entry or return, thereby automatically offering the stable result of the translation instead of the unstable implementation artifacts and obviating the need for an explicit request by the user to perform a translation.

Figure 4:
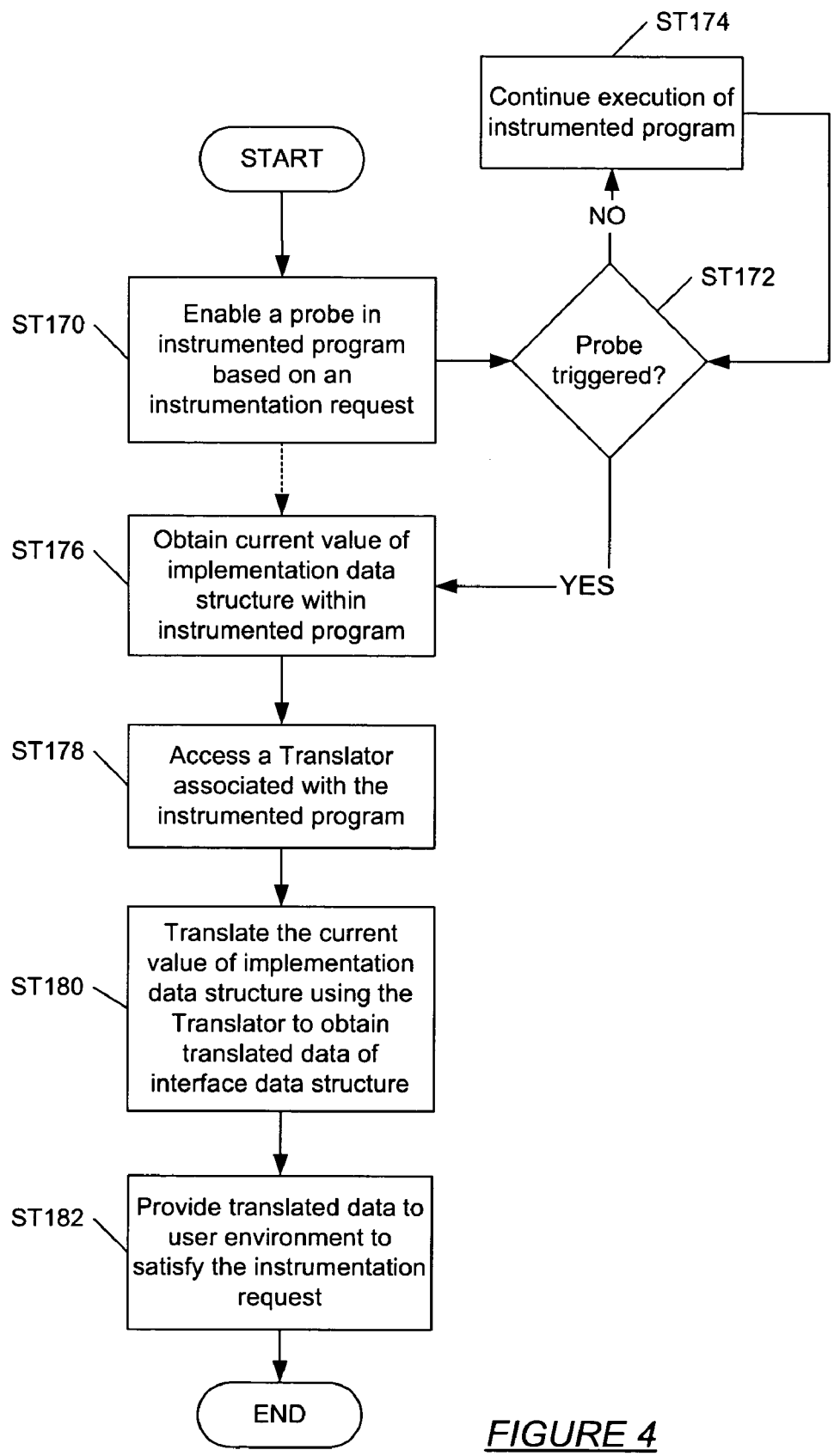
FIG. 4 shows a method of providing data to a user environment using a translator in accordance with an embodiment of the invention.

FIG. 4 shows a method of providing data to a user environment using a translator, in accordance with one or more embodiments of the invention. The first step is enabling a probe in an instrumented program based on an instrumentation request from a user (Step 170). Of course, this step assumes the use of a tracing framework. In the case a debugger is used, the debugger program would simply issue an implementation request and proceed directly to Step 176 (and Steps 172 and 174 would be unnecessary).

When a tracing framework is used, a determination is made whether a probe has triggered (Step 172). If no probe has triggered, then the execution of the instrumented program continues normally until a probe is triggered (Step 174). Once the probe triggers, a current value of the implementation data structure is obtained (Step 176). In one embodiment, the implementation data structure is contained within the instrumented program.

Next, one or more translators associated with the implementation data structure(s) of the instrumented program is accessed (as described in detail above) (Step 178). In one or more embodiments, the current value of the implementation data structure is then translated using the translator to obtain translated data of the interface data structure (again, as described above) (Step 180). Upon translation, the translated data is provided to the user environment through execution environment to satisfy the instrumentation request made by the user (Step 182).

Those skilled in the art will appreciate that the flowchart shown in FIG. 5 may vary according to implementation. For example, the flowchart may show continued execution of the instrumented program after translated data is provided.

The present invention may include one or more of the following advantages. Developers of the execution framework need less intimate knowledge of changing instrumented program internals. For example, users of an execution framework or debugger tool are not required to have a continuous, up-to-date knowledge of a program's implementation artifacts as they change over time (i.e., access to the latest source code). Likewise, such freedom allows developers of the instrumented program greater freedom to make changes. For example, a program author may change the implementation of a program to improve performance or offer new features. Further, by having actions invoked natively from binary code bound to the instrumented program (instead of from an Applications Programming Interface (API)), efficiency is enhanced. For example, API primitives are not built into the execution framework and, therefore, maintenance of the API is not required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of translating data, comprising:
obtaining a value of an implementation data structure from an instrumented program during execution of the instrumented program, wherein the instrumented program is compiled code comprising the implementation data structure;
accessing a translator associated with the instrumented program, wherein the translator comprises a plurality of transformations; and
translating the value of the implementation data structure using the translator to obtain translated data of an interface data structure, wherein the translating comprises applying at least one of the plurality of transformations to convert the value of the implementation data structure into the translated data of the interface data structure, wherein the interface data structure is associated with an interface provided by the instrumented program;
in response to an instrumentation request from a user, providing the translated data to the user to satisfy the instrumentation request, wherein the instrumentation request is a request to perform a function of one of a group consisting of a tracing program and a debugging program.

2. The method of claim 1, further comprising:
executing the tracing program to enable a probe in the instrumented program based on the instrumentation request;
triggering the probe in the instrumented program; and
transferring translated data from the translator to an execution framework, wherein the execution framework comprises a tracing framework.

3. The method of claim 1, further comprising:
executing the debugging program in the instrumented program in response to the instrumentation request; and
transferring translated data to an execution framework in response to the instrumentation request, wherein the execution framework comprises a debugger.

4. The method of claim 1, wherein the translator is defined using a high-level programming language.

5. The method of claim 1, wherein the translator is updated independently of the execution framework.

6. The method of claim 1, further comprising:
delivering the translator using an encoded delivery.

7. The method of claim 1, further comprising:
delivering the translator using a compiled delivery.

8. The method of claim 1, further comprising:
selecting the translator using an instrumentation request.

9. The method of claim 1, further comprising:
selecting the translator using knowledge of a function argument type of the instrumented program.

10. A system for translating data, comprising:
a memory configured to:
  store an instrumented program, wherein the instrumented program is compiled code comprising an implementation data structure;
  store a translator comprising a plurality of transformations;
a processor configured to:
  execute a compiler arranged to compile the plurality of transformations into the translator; and
  execute an execution framework configured to:
    obtain a value of the implementation data structure from the instrumented program during execution of the instrumented program,
    use the translator to convert the value of the implementation data structure into an interface data structure to obtain translated data, wherein the interface data structure is associated with an interface offered by the instrumented program, and
    in response to an instrumentation request from a user, provide the translated data to the user to satisfy the instrumentation request, wherein the instrumentation request is a request to perform a function of one of a group consisting of a tracing program and a debugging program.

11. The system of claim 10, wherein the instrumentation request explicitly translates the value of the implementation data structure into the translated data.

12. The system of claim 10, wherein a function call implicitly triggers the translating the value of the implementation data structure into the translated data.

13. The system of claim 10, wherein the translator is defined using a high-level programming language.

14. The system of claim 10, wherein the translator is updated independently of the execution framework.

15. The system of claim 10, wherein the translator is delivered using at least one selected from the group consisting of encoded delivery and compiled delivery.

16. The system of claim 10, wherein the execution framework comprises at least one selected from the group consisting of a tracing framework and a debugger.

17. A computer system for translating data, comprising:
a processor;
a memory;
a storage device; and
software instructions stored in the memory for enabling the computer system to:
  obtain a value of an implementation data structure from an instrumented program during execution of the instrumented program, wherein the instrumented program is compiled code comprising the implementation data structure;
  access a translator associated with the instrumented program, wherein the translator comprises a plurality of transformations; and
  translate the value of the implementation data structure using the translator to obtain translated data of an interface data structure, wherein the translating comprises applying at least one of the plurality of transformations to convert the value of the implementation data structure into the translated data of the interface data structure, wherein the interface data structure is associated with an interface offered by the instrumented program;
  in response to an instrumentation request from a user, provide the translated data to the user to satisfy the instrumentation request, wherein the instrumentation request is a request to perform a function of one of a group consisting of a tracing program and a debugging program.

18. The computer system of claim 17, wherein the translator is defined using a high-level programming language.

19. The computer system of claim 17, wherein the translator is updated independently of the execution framework.

20. The computer system of claim 17, further comprising software instructions to deliver the translator using an encoded delivery.

21. The computer system of claim 17, further comprising software instructions to deliver the translator using a compiled delivery.

22. The computer system of claim 17, further comprising software instructions to select the translator using the instrumentation request.

23. The computer system of claim 17, further comprising software instructions to select the translator using knowledge of a function argument type of the instrumented program.

* * * * *